United States Patent [19]
Guile et al.

[11] 3,930,874
[45] Jan. 6, 1976

[54] BONDED FUSED GRAIN BASIC REFRACTORY AND BATCH THEREFOR

[75] Inventors: Donald L. Guile, Horseheads; Robert K. Smith, Corning, both of N.Y.

[73] Assignee: Corning Glass Works, Corning, N.Y.

[22] Filed: June 17, 1974

[21] Appl. No.: 480,286

[52] U.S. Cl. .................. 106/57; 106/58; 106/63
[51] Int. Cl.² ............... C04B 35/02; C04B 35/04; C04B 35/48
[58] Field of Search .................. 106/57, 58, 61, 63

[56] References Cited
UNITED STATES PATENTS

| | | | |
|---|---|---|---|
| 2,572,688 | 10/1951 | Austin | 106/58 |
| 3,141,784 | 7/1964 | King et al. | 106/58 |
| 3,262,795 | 7/1966 | Davies et al. | 106/58 |
| 3,715,222 | 2/1973 | Hieb | 106/58 |

*Primary Examiner*—J. Poer
*Attorney, Agent, or Firm*—Barry S. Bissell; Richard N. Wardell; Clarence R. Patty, Jr.

[57] ABSTRACT

Basic refractory batch of coarse and intermediate sized fused or dead-burned dolomitic grain with 20–35% of a fine fraction of dead-burned magnesia and an effective amount of a compound yielding not more than 4% by weight (preferably 0.5–2.5%) zirconia, silica, or mixtures thereof. The dolomitic grain is separated into 2 size fractions (both collectively in the range of −4+65 Tyler mesh) while the magnesite is all −100 Tyler mesh and preferably at least 75% −325 Tyler mesh. The zirconia and silica yielding materials are preferably substantially all −325 Tyler mesh. Formed shape made from the batch and burned at 1600°C is characterized by a modulus of rupture at 1340°C (hot strength) consistently above 1800 psi and occasionally approaching 3000 psi without a significant loss in corrosion resistance to molten basic oxygen furnace slags.

11 Claims, No Drawings

BONDED FUSED GRAIN BASIC REFRACTORY AND BATCH THEREFOR

BACKGROUND OF THE INVENTION

The basic refractories of the present invention are suitable for use in lining high wear areas of the basic oxygen steelmaking furnace (BOF). The current practice for lining a BOF requires the use of premium products in the high wear areas to attain a balanced life of all refractories in the furnace. Presently, the premium grade refractories are made from dead-burned magnesite which has been crushed, sized, bonded by pressing, and fired to high temperatures. Penetration by basic slags and metal leading to rapid corrosion of the refractories is retarded by impregnating the refractory shapes with tar or other coal products which will coke when heated. The coking process fills open pores and forms a layer which repels attack by the furnace slags.

Although the tar-impregnated magnesite (in the art and herein used synonymously with magnesia, both terms commonly describing bodies with periclase as the stable crystalline form) have become widely used, there is a continuing interest in decreasing the cost of refractory material consumed per furnace heat or per ton of steel produced. Lower refractory cost per ton of steel can be obtained by replacing current refractories with a cheaper refractory of equivalent life or by replacing with a refractory having superior properties and life which will more than compensate for any greater initial cost.

Of course, a refractory with superior properties and lower cost is always an ultimate goal. With this in mind, experimenters have moved in the direction of dolomite as a replacement or a partial replacement for the MgO in magnesite brick. This replacement accomplishes a cost reduction, because not only is dolomite more readily available, but the energy requirements for one common method of producing high purity magnesia (from magnesium hydrate produced by a treatment of sea water or other brine) are extremely high. In moving toward dolomite as a refractory raw material, we are moving toward the consumption of less energy in both producing the raw material and in burning the refractory.

The use of dolomite, dead-burned dolomite (a mixture of periclase and calcia) or fused dolomite (a resolidified melt of dolomite or equivalent calcia and magnesia) with or without excess magnesia or calcia is not without its problems. Perhaps the chief problem involves hydration of the dolomite or dead-burned dolomite grains to form calcium hydroxide with an incident volume expansion and weakening of the body. Fused dolomitic grains have been afforded more attention because of their increased hydration resistance, but they still suffer somewhat from hydration. Accounts of fused dolomitic refractory and grain can be found in U.S. Pat. Nos. 3,540,899 and 3,262,795. Both suggest improvements relating to the art of fusion casting basic refractories.

Finally, the steel production measures of a good refractory (number of heats or tons of steel per brick life) are generally not reproducible in the laboratory for evaluation of samples. Therefore, the properties of corrosion/erosion resistance to synthetic basic slags and hot strength provide the quantitative means of comparing laboratory samples. Experience in the art has determined that reliance on these two tests as initial indications of potential furnace life is well founded.

PRIOR ART

Use of fused dolomitic grain (and dead-burned dolomitic grain) bonded with fine magnesia has been suggested by prior experimenters. For example U.S. Pat. No. 3,262,795 suggests a fused refractory of 50–95% MgO and 5–50% CaO, optionally comminuted and bonded with magnesia fines (reference to the MgO bonding material of U.S. Pat. No. 3,060,000). The patent discloses a size grading of −4+10 mesh (30%), −10+28 mesh (35%) and −28 mesh (35%), preferably 20% of total batch passing a 325 mesh screen. (For refractories using dead-burned grain see U.S. Pat. No. 3,060,042 and U.S. Pat. No. 3,141,784).

Davies et al in U.S. Pat. No. 3,520,706 disclose a batch for the production of a burned magnesite refractory the batch comprising at least 90% dead-burned MgO, 0.5%–5.0% zircon and having a lime-silica ratio of between 2:1 and 5:1. The magnesite and zircon are further balanced such that the lime-silica weight ratio in the calcium-magnesium-silicate matrix phase will be between 2:1 and 1.6:1. Suitable impurity limits are also disclosed. The zircon was thought to react with the lime to form calcium-metazirconate and silica.

Good et al in U.S. Pat. No. 3,192,059 teach the manufacture of magnesite-zircon refractories formed from a batch comprising at least 10% zircon and less than 2% CaO.

SUMMARY OF THE INVENTION

We have now discovered a new burned basic refractory and a batch from which to fabricate it, that exhibits improved hot strength without any loss of resistance to molten furnace slags. Such refractory is a bonded, fused grain refractory burned at 1600°C or higher and characterized by a hot strength (modulus of rupture at 1340°C, unless another temperature is specified) consistently above 1800 psi and in certain cases of at least 3000 psi, making the refractory particularly useful in the high wear areas of basic oxygen furnaces.

The improved properties of the new refractory result from the minor batch addition of zirconia and/or silica yielding materials to refractory batches of coarse dolomitic fused or dolomitic dead-burned grain and fine MgO.

Accordingly, the present invention is a size-graded particulate batch, and a compacted and burned refractory body made therefrom, the batch being a mixture of fine material yielding zirconia, silica, or mixtures thereof, dead-burned magnesite, and at least one dead-burned or fused dolomitic grain, the dead-burned grain and the fused grain consisting essentially of, by weight on the oxide basis:

50–67% MgO, 33–50% CaO and preferably at least 98% MgO + CaO,

40–50% of the refractory batch being a coarse fraction whose particles are substantially all −4+35 mesh and composed of at least one of said dead-burned or fused dolomitic grains, 20–30% being an intermediate fraction whose particles are substantially all −20+65 mesh and composed of at least one of said dead-burned or fused dolomitic grains, 20–35% of the refractory batch being a fine fraction whose particles are substantially all −100 mesh and consisting essentially of said dead-burned magnesite (preferably 75% of which passes a 325 mesh screen) and a strength additive selected from $ZrO_2$ and/or $SiO_2$ yielding materials and mixtures thereof (preferably all $-325$ mesh), the strength additive selected in an amount sufficient to provide, by weight based on the total batch, 0.5–4.0% (preferably 0.5–2.5%) $ZrO_2$, $SiO_2$ or mixtures thereof.

Less than about 0.5% of $ZrO_2$ and/or $SiO_2$ in the burned refractory has been found not to enhance the hot strength appreciably and greater than about 4% $ZrO_2$ and/or $SiO_2$ in the burned refractory has been found to weaken the refractory appreciably. Any of the various commercially available $ZrO_2$ and/or $SiO_2$ yielding materials can be used, but the individual oxides and the compound $ZrSiO_4$ are preferred. Examples of $ZrO_2$ yielding materials which the inventors believe would be suitable include: zircon sand, various grades of zirconia containing $ZrO_2$ in amounts of about 85% up to greater than 99%, zirconium hydroxide, zirconium sulfate, zirconium tetrachloride, zirconium oxychloride, and zirconyl chloride.

The dead-burned magnesite can be any of the ordinary, relatively high purity, available materials having periclase as the principal stable crystalline phase. The magnesite is preferably at least 98% MgO and not greater than 0.2% $Al_2O_3$. The particle size of the MgO is $-100$ mesh, preferably 75% of which is $-325$ mesh.

A typical oxide range for the fused or dead-burned grain is 50–67% MgO, 33–50% CaO, up to 0.7% $SiO_2$, up to 0.5% $Al_2O_3$, up to 0.4% FeO and up to 0.5% $Cr_2O_3$. The fused grain is preferably 98% MgO and CaO and obtained by crushing an electrically melted, fusion-cast block made from a batch of raw or dead-burned dolomite with or without excess additions of CaO or MgO; the dolomite being a reasonably priced source of MgO and CaO. Before calcining or dead-burning, raw dolomite has a theoretical composition of $CaO.MgO.2CO_2$ which corresponds to CaO 30.4%, MgO 21.9% and $CO_2$ 47.7%. A commercially available dead-burned dolomite which has been used by the applicants is Ohio Lime Company dolomitic pebble analyzing 57.8% CaO, 41.2% MgO, 0.5% $SiO_2$, 0.2% $Fe_2O_3$, 0.15% $Al_2O_3$ with 0.15% LOI. A preferred batch for making dolomitic fused or dead-burned grain is 70% Ohio dolomite - 30% MgO, yielding a grain with an oxide compositional analysis of 59.3% MgO, 40.3% CaO, 0.2% $Al_2O_3$, others 0.2% ($Fe_2O_3$, $Cr_2O_3$, $SiO_2$). Equiaxial (round) grains of fused dolomitic material are preferred over sharp, flat grains in making the refractory bonded refractory bodies.

In the raw material batch of the present invention, the fused or dead-burned dolomitic grains make up the coarse ($-4+35$ mesh) and intermediate ($-20+65$ mesh) size fractions and the MgO plus the strength additive make up the fine fraction ($-100$ mesh). Particle size distributions of the dolomitic grain and MgO (ternary and quaternary systems) which yield burned bodies of particularly high hot strength are disclosed and claimed by the present applicants in two U.S. Pat. applications (incorporated herein by reference) filed June 17, 1974 and given Ser. Nos. 480,284 and 480,285. Both the ternary and the quaternary systems result in dense burned refractories of good hot strength and slag corrosion resistance. The zirconia and/or silica addition of the present invention to the fine MgO fraction of the refractory batches of the prior applications results in burned refractories of superior hot strength, for example, increases in hot strength of at least 50 percent in refractories made from the previously mentioned size-graded batches with additions of 2 weight percent fine zircon, zirconia and/or silica as compared with refractories made from the batches without the strength additions.

The preferred size distribution of particles for the 3-component system is 40–50% $-4+10$ mesh, 20–30% $-20+35$ mesh, and 25–35% $-100$ mesh (75% of which is $-325$ mesh). The fused grains make up the $+35$ mesh fractions while the MgO and the $ZrO_2$ and/or $SiO_2$ yielding materials make up the $-100$ mesh fraction.

DESCRIPTION OF THE PREFERRED EMBODIMENTS

EXAMPLE 1

A variety of batch compositions were formulated and pressed into bricks for experimental comparisons. A standard brickmaking procedure was adhered to throughout the testing. The control batch consisted of 45% $-4+10$ mesh fused dolomitic grain, 25% $-20+35$ mesh fused dolomitic grain and 30% finer than 100 mesh (75% through 325 mesh) dead-burned magnesite. The experimental batches were substantially identical but for the substitution of the indicated quantities (in Table I) of $-325$ mesh $ZrSiO_4$, $SiO_2$, and/or $ZrO_2$ for an equal amount of MgO. In all cases the batch ingredients were heated with 3% paraffin until the paraffin melted (about 60°C), and then mulled for 10 minutes. The bricks were then pressed at 10,000 psi and burned at 1600°C for 16 hours, yielding burned refractories with densities of 2.90–2.98 g/cc. The average 1340°C modulus of rupture (hot strength) and the slag corrosion resistance were found and are recorded in Table I. Bricks were conventionally tar impregnated for the slag test using a 60°–65°C impregnating pitch.

TABLE I

| Strength Additive | Amount Substituted (wt%) | No. of Specimens | Hot Strength (psi) | No. of Specimens | Slag Cut % of Control |
|---|---|---|---|---|---|
| None (Control Composition) | — | 100 | 1225 | — | 100% |
| $SiO_2$ | 0.5 | 20 | 2035 | 5 | 113% |
| $SiO_2$ | 1.0 | 12 | 2045 | 1 | 90% |
| $SiO_2$ | 2.0 | 8 | 2430 | 2 | 100% |
| $ZrO_2$ | 1.3 | 8 | 2415 | 2 | 85% |
| $ZrO_2 + SiO_4$ | 1.3 + 0.7 | 8 | 2770 | 2 | 94% |
| $ZrSiO_4$ | 0.7 | 8 | 1875 | 2 | 95% |
| $ZrSiO_4$ | 2.0 | 144 | 1925 | 23 | 109% |
| $ZrSiO_4$ | 3.0 | 4 | 1385 | — | — |
| $ZrSiO_4$ | 5.0 | 4 | 870 | — | — |

The one fused grain used in the raw batches was obtained by crushing a fusion cast billet produced from a batch of 70% Ohio Lime Company dolomitic pebble and 30% Magmaster MgO (Michigan Chemical Corporation). The oxide analysis of the fused grain was MgO 59.3%, CaO 40.3%, Al$_2$O$_3$ 0.2%, others 0.2% (Fe$_2$O$_3$, Cr$_2$O$_3$, SiO$_2$). The magnesite analyzed 98.5% MgO, 0.55% CaO, 0.38% SiO$_2$, 0.18% Fe$_2$O$_3$, 0.01% Al$_2$O$_3$, and 0.13% LOI.

The slag cut of the samples is reported in Table I as a percent of the control composition (without additives). The absolute values were obtained in a rather severe procedure devised to determine the relative corrosion resistance of laboratory samples. In general, the particular slag under consideration contacts, for a specified time, a rotating laboratory furnace cavity which is constructed from the test and control refractories. An electric arc maintains the slag at a normal temperature of about 1750°C. The absolute resistance is then determined by measuring the depth of slag cut into the test refractory and into the control refractory. Volume of the refractory removed and weight loss of the brick are other convenient properties which can be monitored for comparison. In this particular series of tests, the slag had a composition of 20.0% FeO, 53.5% CaO, 21.5% SiO$_2$ and 5.0% Al$_2$O$_3$, giving a lime-silica ratio of 2.5.

Typical analyses of the strength additives are as follows:

Milled Zircon - 66.0% ZrO$_2$, 33.0% SiO$_2$, 0.4% Al$_2$O$_3$, 0.15% TiO$_2$, 0.03% Fe$_2$O$_3$.

Zirconia - 99$^+$% ZrO$_2$, 0.18% SiO$_2$, 0.16% Al$_2$O$_3$, 0.1% Fe$_2$O$_3$, 0.22% TiO$_2$, 0.015% CaO.

Silica - 99.8$^+$% SiO$_2$, 0.02% Al$_2$O$_3$, 0.01% Fe$_2$O$_3$, 0.01% TiO$_2$.

EXAMPLES 2-4

Several bricks were prepared (using the procedure of Example 1) from each of three refractory batches using three similar fused grains and substantially identical magnesite fine fractions. Example 2 used fused grain A which is substantially identical with the fused grain of Example 1. Example 3 used fused grain B and Example 4 used fused grain C. The fine MgO fraction in each example was dead-burned magnesite obtained from Kaiser-Midland Corporation and analyzed 96.6% MgO, 1.1% CaO, 1.8% SiO$_2$, 0.2% Al$_2$O$_3$, 0.3% Fe$_2$O$_3$ and 0.4% B$_2$O$_3$.

Fused grain B in Example 3 is a melted, solidified and crushed mixture of 69.5% Ohio Lime Company dolomite, 30% Kaiser MgO and 0.5% CaF$_2$. Fused grain C is a crushed fusion of 70% Ohio Lime Company dolomite and 30% Kaiser MgO. The calcium fluoride was added as fluorspar analyzing 98.8% CaF$_2$, 1.1% SiO$_2$ and 0.1% Fe$_2$O$_3$.

The slag test was run as in Example 1 but herein the control or standard refractory (for comparison with the experimental bricks) was a commercial tar impregnated dead-burned magnesite refractory which is currently in steel plant use and sold by North American Refractories under the trade name of Nartar P.A.D. The Nartar P.A.D. was used in each test run as a standard of comparison so that experimental samples from different slag test runs could be compared, each being rated with regard to slag abrasion as a percentage of the abrasion of the Nartar P.A.D. refractory used in the same slag test run.

TABLE II

|  | % Additive | Density (g/cc) | 1340°C Modulus of Rupture (psi) | Slag Test Cut Inches | % Nartar P.A.D. |
|---|---|---|---|---|---|
| Example 2 | | | | | |
| "A" Grain | | | | | |
| 2-1 | 0 | 2.93 | 1758 | 0.22 | 85 |
| 2-2 | 0.7 Zircon | 2.91 | 1930 | 0.20 | 77 |
| 2-3 | 2.0 Zircon | 2.91 | 3100 | 0.24 | 94 |
| 2-4 | 0.7 SiO$_2$ | 2.92 | 3000 | 0.22 | 85 |
| 2-5 | 2.0 SiO$_2$ | 2.87 | 2878 | 0.23 | 89 |
| 2-6 | 1.3 ZrO$_2$ | 2.96 | 2308 | 0.22 | 85 |
| 2-7 | 0.7 SiO$_2$ + 1.3 ZrO$_2$ | 2.97 | 2025 | 0.30 | 85 |
| Example 3 | | | | | |
| "B" Grain | | | | | |
| 3-1 | 0 | 2.93 | 2365 | 0.22 | 62 |
| 3-2 | 2.0 Zircon | 2.95 | 2835 | 0.24 | 66 |
| Example 4 | | | | | |
| "C" Grain | | | | | |
| 4-1 | 0 | 2.95 | 1570 | 0.28 | 51 |
| 4-2 | 2.0 Zircon | 2.98 | 2508 | 0.32 | 58 |

In several cases, especially at higher additive levels, the strength additive resulted in increased strength in the rebonded brick but also resulted in slightly lower slag resistance. The maximum benefit to the strength of the rebonded brick occurs at about the 2% level of zircon and zirconia addition and at a slightly lower level for the SiO$_2$, so that most experiments were carried out near this preferred 2% level. Bodies with up to 4% of the additives, however, still have increased strengths over bodies without additives, although again, the strength is decreasing with increased "strength" additive in the 2-4% additive range.

In the foregoing specification, all mesh sizes are according to the Tyler series and all material percentages are on the weight basis.

We claim:

1. A size-graded batch for the production of basic refractory bodies and consisting essentially of, with percentages on the weight basis, a mixture of,
   a. dead-burned magnesite,
   b. at least one strength additive selected from the group consisting of materials yielding silica, materials yielding zirconia, and mixtures thereof, and
   c. at least one refractory grain analytically consisting essentially of 50-67% MgO and 33-50% CaO and selected from the group consisting of dead-burned grain, fused grain, and mixtures thereof,
   40-50% of the batch being a coarse grain fraction whose grains are substantially all −4+35 Tyler mesh and composed of said refractory grain,
   20-30% being an intermediate grain fraction whose grains are substantially all −20+65 Tyler mesh and composed of said refractory grain, 20–35% being a fine fraction whose particles are substantially all −100 Tyler mesh and consisting essentially of said strength additive in amount sufficient to provide, based on the whole batch, 0.5–4.0% of oxide selected from $SiO_2$, $ZrO_2$ and mixtures thereof, with the balance of the fine fraction being substantially all said dead-burned magnesite.

2. The batch of claim 1 wherein said strength additive is selected in an amount sufficient to yield 0.5–2.5% of oxide selected from $SiO_2$, $ZrO_2$ and mixtures thereof.

3. The batch of claim 2 wherein said strength additive is selected from $SiO_2$, $ZrO_2$, and $ZrSiO_4$.

4. The batch of claim 3 wherein
at least 75% of the dead-burned magnesite particles are −325 Tyler mesh, and
substantially all of the strength additive particles are −325 Tyler mesh.

5. The batch of claim 4 wherein
said refractory grains of said coarse grain fraction are substantially all −4+10 Tyler mesh, and
said refractory grains of said intermediate grain fraction are substantially all −20+35 Tyler mesh.

6. A compacted and burned refractory body made from the batch of claim 1.

7. The refractory body of claim 6 which has been burned at a temperature of at least 1600°C.

8. A compacted and burned refractory body made from the batch of claim 3.

9. The refractory body of claim 8 which had been burned at a temperature of at least 1600°C.

10. A compacted and burned refractory body made from the batch of claim 5.

11. The refractory body of claim 10 which had been burned at a temperature of at least 1600°C.

* * * * *